Feb. 18, 1958   J. O. HELVERN   2,823,770
ACTUATING MECHANISM FOR A FRICTION BRAKE
Filed March 21, 1956

INVENTOR.
James O. Helvern
BY
Craig V. Morton
HIS ATTORNEY

United States Patent Office 2,823,770
Patented Feb. 18, 1958

2,823,770

ACTUATING MECHANISM FOR A FRICTION BRAKE

James O. Helvern, Lewisburg, Ohio, assignor to General Motors Corporation, Detroit, Mich., a corporation of Delaware Application March 21, 1956, Serial No. 572,942

2 Claims. (Cl. 188—72)

This invention relates to friction brakes, and particularly to friction brakes of the disk type.

An object of the invention is to provide an actuating member to effect movement of the disk members of a disk brake that is readily manufactured and assembled into a disk brake.

It is another object of the invention to provide an actuating member for a disk brake that is in the form of an annulus on which exterior peripheral surfaces are provided for close tolerance machining that will engage interior peripheral surfaces in a recess in a brake housing that are also adapted for close tolerance machining, the matching surfaces being such as to provide for sliding movement of the actuating member within the recess with the fluid receiving chamber formed between the actuating member and the housing to receive fluid under pressure from a master cylinder of a hydraulic brake system for actuation of the actuating member.

Further objects and advantages of the present invention will be apparent from the following description, reference being had to the accompanying drawings wherein a preferred form of the invention is clearly shown.

Figure 1:
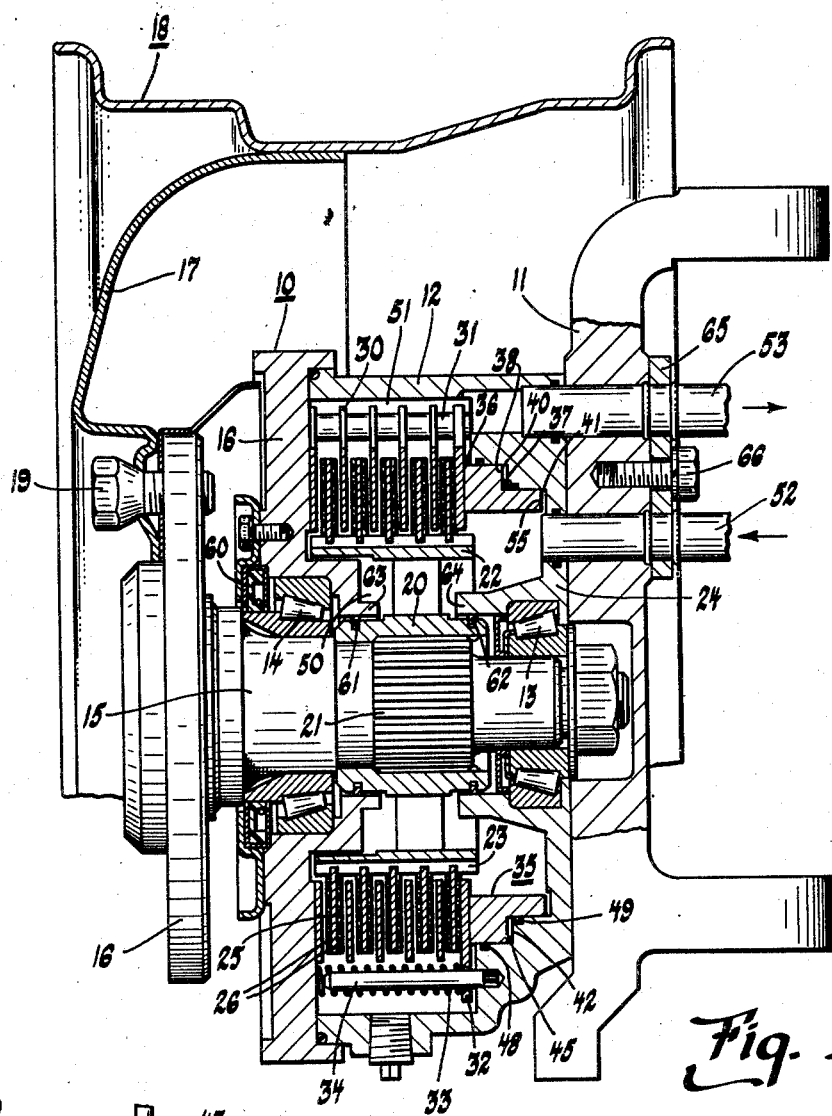
Figure 1 is a vertical cross sectional view of a disk brake illustrating features of this invention.
Figure 2:
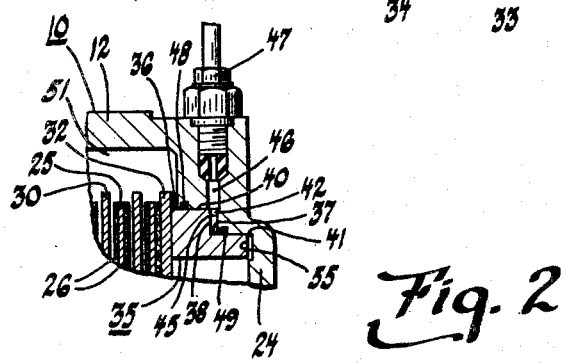
Figure 2 is a partial cross sectional view of the structure of Figure 1 showing the passage means through which brake fluid from the master cylinder of the hydraulic brake system is admitted into the brake for actuation of the same.

The brake 10 of this invention is supported upon the steering knuckle 11, the brake illustrated in the drawing being that of a front wheel brake. The brake housing 12 is stationarily secured to the steering knuckle 11 in any suitable manner. The brake housing 12 supports the anti-friction bearings 13 and 14 in the inboard wall 24 and the outboard wall 16 thereof respectively. A wheel spindle 15 is supported within the anti-friction bearings 13 and 14. The wheel spindle 15 has a flange 16 that supports the wheel flange 17 of a vehicle wheel 18, suitable studs 19 securing the wheel flange 17 to the flange 16 of the spindle 15.

The wheel spindle 15 supports a hub 20 that is carried on the splined portion 21 for rotation with the spindle 15. The hub 20 carries a disk support member 22 that has the external periphery provided with axially extending splines or teeth 23 that receive and support brake disks 25 for rotation with the spindle 15. The brake disks 25 are surfaced with friction material 26 on opposite sides thereof adapted to engage the metal brake disks 30 that are non-rotatably supported by the stationary brake housing 12, one or more studs 31 being engaged by the brake disks 30 to prevent their rotation relative to the brake housing 12. An actuating plate 32 is provided at one end of the assemblage of the stationary and rotating disks 30, 25 to effect movement and thereby engagement of the disks with one another when the plate 32 is moved in a left hand direction, as viewed in Fig. 1. The plate 32 is normally retained in the position shown in Fig. 1, that is brake disengaged position, by means of compression springs 33 that are positioned around the periphery of the disk assemblage, the springs being supported on studs 34 mounted in the brake housing 12.

An actuating member 35 engages the actuating plate 32 and is adapted to be hydraulically operated by brake fluid supplied from a master cylinder of a hydraulic actuating system.

The actuating member 35 is in the form of an annulus that is substantially L-shaped in transverse cross section. The member 35 has an exterior peripheral surface 36 that is coaxial with the axis of the annulus ring 35 and extends in an axial direction. A second exterior peripheral surface 37 is provided on the ring 35 and is coaxial with the surface 36 and coaxial with the axis of the ring. The two surfaces 36 and 37 are interconnected by a radial wall 38 thereby forming a Z-shaped surface on the exterior surface of the actuating member 35.

The annular surface 36 on the actuating ring 35 slidably engages an inner peripheral surface 40 that is provided in a recess in the brake housing 12. Similarly, the annular surface 37 on the actuating ring 35 engages an inner peripheral surface 41 in the recess in the brake housing, the surfaces 40 and 41 being connected by a radial surface 42 thereby forming an annular recess in the housing 12 that complements the Z-shaped surface on the ring 35 so that the complementary surfaces 36, 40 and 37, 41 are in sliding engagement for axial movement of the ring 35 within the recess in the housing 12.

The surfaces 36 and 37 as well as the surface 38 on the ring 35 are all exterior surfaces that can be readily machined to close tolerance limits on conventional lathe equipment. Similarly, the surfaces 40 and 41 together with the wall surfaces 42 forming the annular recess in the brake housing 12 are all interior surfaces that can be readily machined to close tolerance limits so that the manufacturing tolerance between the complementary surfaces 36, 40 and 37, 41 can be maintained to very close limits.

The wall surfaces 42 and 38 together with portions of the surfaces 40 and 37 form a fluid receiving chamber 45 that is adapted to receive hydraulic fluid under pressure from the master cylinder of a hydraulic brake system through the supply port 46 and the line connection 47 that connects with a master cylinder (not shown).

An annular O-ring seal 48 is provided between the surfaces 36, 40 and a similar annular O-ring seal 49 is provided between the cooperating surfaces 37, 41 to prevent loss of hydraulic fluid from the fluid receiving chamber 45.

It will be obvious that when hydraulic fluid under pressure is supplied into the fluid receiving chamber 45 from a master cylinder of a hydraulic brake system that the actuating annulus 35 will be moved in a left hand direction to effect compression of the brake disk stack 25, 30 and thereby effect brake action on the spindle 15.

The disk assemblage 25, 30 divides the brake housing 12 into an inner chamber 50 and an outer chamber 51 adapted to receive fluid for circulation between the brake disks 25, 30 for cooling purposes. A conduit 52 connects with the chamber 50 and a similar conduit 53 connects with the chamber 51 for supply and exhaust of fluid to and from the chambers and through the disk assemblage 25, 30. As shown in the drawing, the conduit 52 supplies fluid under pressure to the inner chamber 50 for circulation radially outwardly through the disk brake assemblage 25, 30 for exhaust through the conduit 53, thereby removing the heat of friction caused during a brake action. It is understood that the friction linings 26 have suitable passages therein that provide for circulation of fluid between the brake disks 25, 30 when they are in braking engagement.

The actuator ring 35 has a substantially radial wall portion 55 that is exposed to the pressure of the cooling fluid within the chamber 50 whereby the ring 35 is urged in a left hand direction by the pressure of the fluid in the chamber 50 to offset a portion of the pressure of the fluid passing between the disks radially. The pressure of the cooling fluid acting on the wall surface 55 therefore aids the hydraulic pressure within the fluid chamber 45 during engagement of the disks 25, 30 and lowers the actual pedal pressure required to effect and maintain the desired level of brake disk engagement.

The anti-friction bearing 14 is provided with a shaft seal 60 that prevents loss of cooling fluid through the bearing 14. Metal ring seal members 61 and 62 are provided on the hub 20 and engage the annular wall portions 63 and 64 of the brake housing to retain the cooling fluid within the chamber 50.

The conduits 52 and 53 are suitably supported in an attachment plate 65 that is secured to the steering knuckle 11 by means of a bolt 66.

While the form of embodiment of the invention as herein disclosed constitutes a preferred form, it is to be understood that other forms might be adopted as may come within the scope of the claims which follow.

What is claimed is as follows:

1. In a friction brake, the combination of, a stationary brake housing, a rotatable axle shaft in said housing, disk brake means within said housing some of which are connected with said shaft for rotation therewith and others of which are stationary with said housing and dividing said housing into a first fluid chamber internally of said disk means and a second fluid chamber externally of said disk means, means providing for supply of fluid under pressure into one of said chambers, means providing for exhaust of fluid from the other of said chambers, an actuating member in the form of an annulus having a part thereof engaging said disk means to effect braking engagement thereof, said actuating member having a transverse cross section substantially in the form of an L and provided with exteriorly peripheral annular axially extending coaxially parallel surfaces slidably engaging cooperating axially extending peripherally interior coaxially parallel annular surface in a recess in said housing receiving said actuating member and providing thereby an actuating brake fluid receiving chamber between said actuating member and said housing, and means in said housing forming a brake fluid flow passage connected with said last mentioned chamber, said actuating member having at least part thereof opposite to that part engaging said disk means exposed to the fluid pressure in the said chamber receiving the same.

2. In a friction brake, the combination of, a stationary brake housing, a rotatable axle shaft in said housing, disk brake means within said housing some of which are connected with said shaft for rotation therewith and others of which are stationary with said housing and dividing said housing into a first fluid chamber internally of said disk means and a second fluid chamber externally of said disk means, means providing for supply of fluid under pressure into one of said chambers, means providing for exhaust of fluid from the other of said chambers, an actuating member in the form of an annulus in said first chamber and having a part thereof engaging said disk means to effect braking engagement thereof, said actuating member having first and second externally peripheral annular wall surfaces coaxial with the axis of said actuating member and coaxial with each other on different radii with the end of one of said surfaces connected by wall means with an end of the second surface and forming thereby a substantially Z-shaped surface in transverse cross section of said actuating member, said housing having a recess provided with first and second annular internally axially extending wall surfaces coaxial with the axis of said actuating member with the said housing wall surface slidably engaged by the wall surfaces of said actuating member and forming therewith a fluid receiving chamber between said housing and said actuating member, and means in said housing forming a fluid flow passage connected with the so-formed chamber.

References Cited in the file of this patent

UNITED STATES PATENTS

| 1,961,207 | Dierfeld | June 5, 1934 |
| 2,082,277 | Dierfeld | June 1, 1937 |
| 2,407,699 | Hill | Sept. 17, 1946 |

FOREIGN PATENTS

| 163,649 | Australia | June 27, 1955 |